(12) United States Patent
Metzger et al.

(10) Patent No.: US 9,233,723 B1
(45) Date of Patent: Jan. 12, 2016

(54) TORSIONAL ISOLATION OF A DRIVE SYSTEM

(71) Applicant: Caterpillar Inc., Peoria, IL (US)

(72) Inventors: Rustin Metzger, Congerville, IL (US); Justin Speichinger, Edwards, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 14/447,925

(22) Filed: Jul. 31, 2014

(51) Int. Cl.
*B62D 55/12* (2006.01)
*F16D 43/20* (2006.01)
*B62D 55/32* (2006.01)

(52) U.S. Cl.
CPC ............... *B62D 55/12* (2013.01); *B62D 55/32* (2013.01); *F16D 43/20* (2013.01)

(58) Field of Classification Search
CPC ......... B62D 55/06; B62D 55/08; B62D 55/14
See application file for complete search history.

(56) References Cited

U.S. PATENT DOCUMENTS

| | | | |
|---|---|---|---|
| 4,690,231 A | 9/1987 | Riml | |
| 4,932,831 A * | 6/1990 | White et al. | 414/732 |
| 6,263,989 B1 * | 7/2001 | Won | 180/9.32 |
| 7,905,559 B2 | 3/2011 | Angot et al. | |
| 2010/0139995 A1 * | 6/2010 | Rudakevych | 180/9.32 |
| 2014/0260504 A1 * | 9/2014 | Hickerson | 72/449 |

FOREIGN PATENT DOCUMENTS

| | | |
|---|---|---|
| JP | 2006007894 A | 1/2006 |
| JP | 2006007897 A | 1/2006 |

* cited by examiner

*Primary Examiner* — Kevin Hurley
(74) *Attorney, Agent, or Firm* — Baker & Hostetler LLP

(57) ABSTRACT

A hydraulic drive system may include a hydraulic motor and a drive sprocket. The hydraulic drive system may also include a torsional isolation member that is operably connected between the hydraulic motor and the drive sprocket. The torsional isolation member may be configured to operably disconnect the hydraulic motor from the drive sprocket when the drive sprocket reaches a predetermined torque load.

16 Claims, 7 Drawing Sheets

TORSIONAL ISOLATION OF A DRIVE SYSTEM

TECHNICAL FIELD

This disclosure generally relates to high-drive track machines having hydraulic drive systems and, more particularly, relates to torsional isolation of a hydraulic motor from a drive sprocket within the hydraulic drive system.

BACKGROUND

Machines are used in various operations to push material from one point to another. One such machine used for moving material is a high-drive track machine. High-drive track machines have elevated drive sprockets, which can improve durability. High-drive track machines have drive sprockets that are raised above the ground level, higher than conventional sprockets on oval-shaped drive track machines, to reduce the amount of mud, sand, earth, or other debris from interfering with the drive sprocket. As well, because the drive sprocket, transmission and hydraulic systems are elevated, this may ease the serviceability because the components are more accessible.

One aspect pertaining to conventional high-drive track machines is that they have relatively less track wrapped around the drive sprocket than the oval-shaped drive track machines. As such, during extreme load conditions, some high-drive track machines may suffer from sprocket jumping, which occurs when the drive track jumps from the drive sprocket segment without properly receiving torque/power from the drive sprocket. Described from the perspective of the drive sprocket, when the drive sprocket disengages the drive track, the drive sprocket suddenly accelerates and spins freely. The drive sprocket then slams against a subsequent portion of the drive track, which may induce large torsional forces into the drivetrain and motor. Consequently, the magnitude of these forces, over time, may cause damage to the motor.

One prior art solution to dampening unwanted vibration is disclosed in Japanese Patent Publication No. JP2006007894A ("'894 publication"), which discloses a crawler that is wound over a sprocket, an idler and upper and lower rollers. The '894 publication discloses interposing a means for suppressing vibration in a region between the idler and/or the sprocket. A drawback to the solution disclosed in the '894 publication is that it does not isolate the motor from the extreme shock load that may occur as a result of sprocket jumping. Consequently, the motor may still suffer damage from the extreme shock loads.

Another drawback to the solution disclosed in the '894 publication is that it is intended for normal vibration levels that occur during operation and does not appear to provide a solution to dampening extreme shock loads that may far exceed normal vibration levels. Yet another drawback is that this solution is intended for oval-shaped drive track machines and may be incompatible with the unique configuration of the elevated drive sprocket in high-drive track machines.

SUMMARY

In one aspect, the disclosure describes a drive system that includes a motor, a drivetrain having at least one shaft operably connected to the motor, wherein the motor is configured to rotate the drivetrain, a drive sprocket operably connected to the drivetrain such that rotation of the drivetrain rotates the drive sprocket, wherein the drive sprocket is arranged and configured to move a drive track, and a torsional isolation member operably connected between the motor and the drive sprocket, wherein the torsional isolation member is arranged and configured to operably disconnect the motor from the drive sprocket when the drive sprocket reaches a predetermined torque load.

In another aspect, the disclosure describes a machine that includes a motor, a drivetrain having at least one shaft operably connected to the motor, wherein the motor is arranged and configured to rotate the drivetrain, a drive sprocket operably connected to the drivetrain such that rotation of the drivetrain rotates the drive sprocket, a drive track movably connected to the drive sprocket, and a torsional isolation member operably connected between the motor and the drive sprocket, the torsional isolation member arranged and configured to operably disconnect the motor from the drive sprocket when the drive sprocket reaches a predetermined torque load.

In yet another aspect, the disclosure describes a method of manufacturing a drive system that includes connecting a drivetrain having at least one shaft to a motor, wherein the motor is arranged and configured to rotate the drivetrain, connecting a drive sprocket to the drivetrain such that the rotation of the drivetrain rotates the drive sprocket, wherein the drive sprocket is arranged and configured to move a drive track, and connecting a torsional isolation between the motor and the drive sprocket, wherein the torsional isolation member is arranged and configured to operably disconnect the motor from the drive sprocket when the drive sprocket reaches a predetermined torque load.

DETAILED DESCRIPTION

Figure 1:
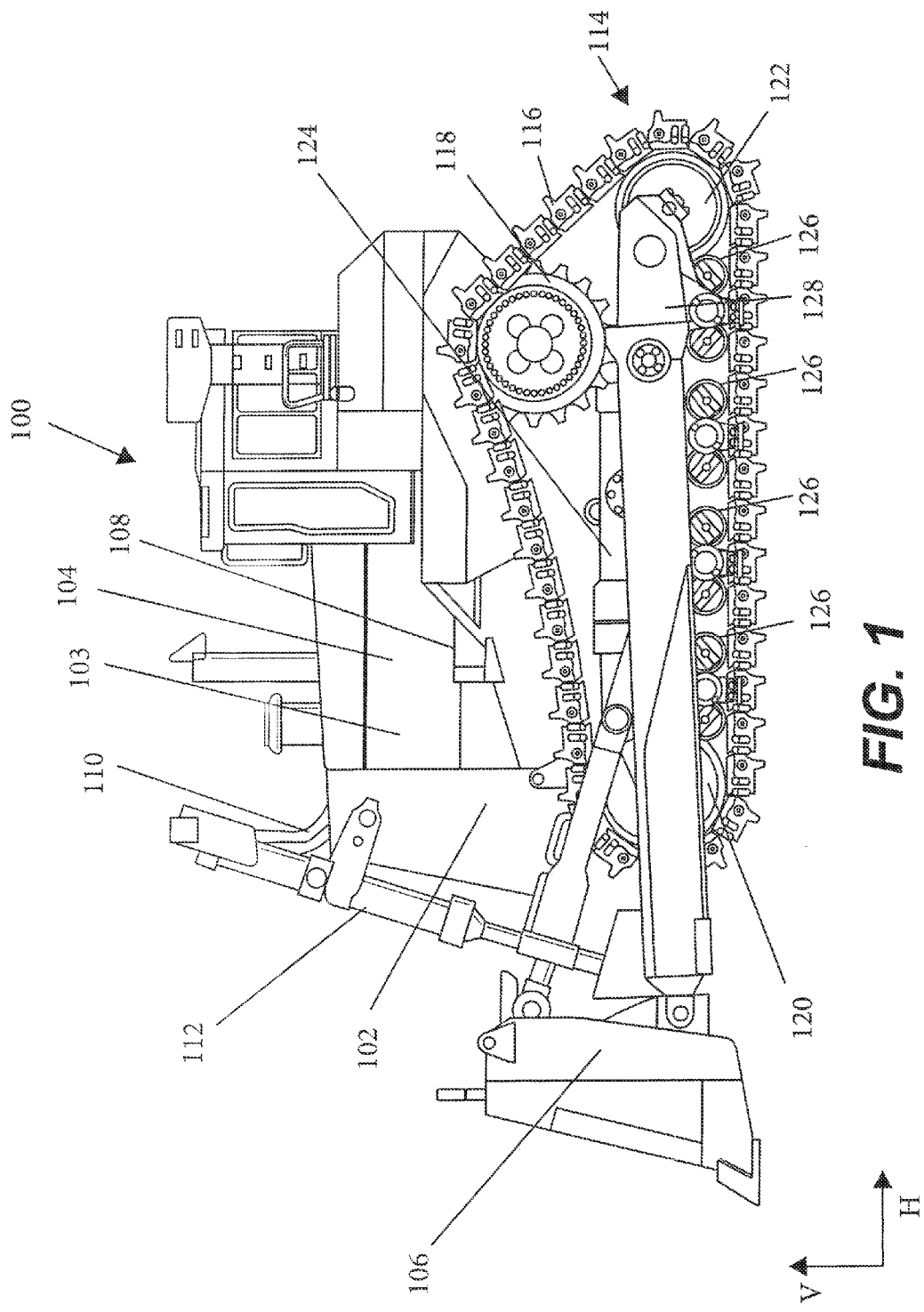
FIG. 1 is a side view of a machine according to an aspect of the disclosure.

Now referring to the drawings, FIG. 1 illustrates a high-drive track machine ("machine") 100 constructed in accordance with the present disclosure. While the following disclosure will be provided with primary reference to a high-drive track machine, it is to be understood that the teachings of this disclosure could be used with other track machines including, but not limited to, oval-shaped drive track machines, track loaders, excavators, pipelayers, and the like.

As illustrated, the machine 100 may include a chassis 102 that supports an engine 103 that is operably connected to a hydraulic pump (not shown but underneath the chassis 102). In some aspects, the machine 100 may be remotely controlled. As well, various tools or implements may be mounted on the machine 100 such as, but not limited to, a blade 106 and a ripper, which is not shown in FIG. 1.

A pump 108, such as a hydraulic pump, may be operatively coupled to the motor 104 to provide pressurized hydraulic fluid, via hoses 110, to hydraulic cylinders 112 for lifting or otherwise moving the tools and implements. As such, in some aspects, the motor 104 is a hydraulic motor. However, it should be appreciated that the motor 104 may be any type of motor or engine configured to create motion or produce power. For example, the motor 104 may be an electric motor (such as an AC and/or DC motor), electrostatic motor, servomotor, stepper motor, actuator, rocket motor, pneumatic motor, and the like.

Figure 2:
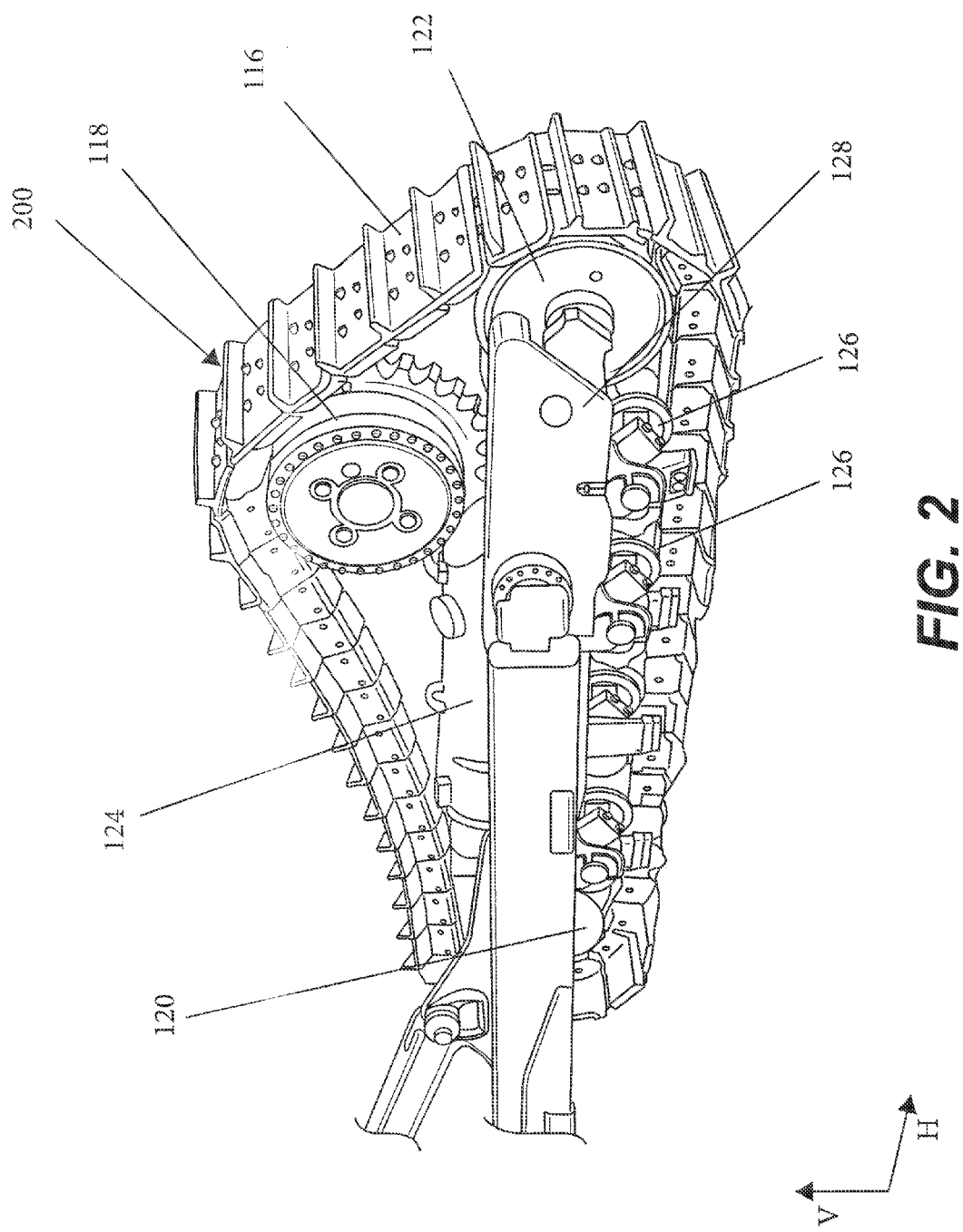
FIG. 2 is a fragmentary perspective view of a lower portion of the machine from FIG. 1 showing a drive track, first and second idlers, and a drive sprocket.

As further shown in FIGS. 1 and 2, the undercarriage 114 includes a drive track 116 that is provided in the form of an endless loop that is trained around a drive sprocket 118 and first and second idlers 120 and 122 that are supported by a track roller frame 124. In this manner, the drive track 116 is movably connected to the drive sprocket 118 and the first and second idlers 120 and 122. Alternatively, it may also be said that the drive sprocket 118 and the first and second idlers 120 and 122 are rotatably connected to the drive track 116.

As illustrated in FIGS. 1 and 2, the first and second idlers 120 and 122 may be spaced from each other along a horizontal direction H. As well, the drive sprocket 118 may be mounted above the first and second idlers 120 and 122 along a vertical direction V that is perpendicular to the horizontal direction H. While the drive track 116 is depicted as a high-drive type drive track 116 in that the drive sprocket 118 is mounted above the first and second idlers 120 and 122 along the vertical direction V, it is to be understood that the teachings of this invention can be employed with oval-shaped drive track machines, as previously discussed.

With continued reference to FIGS. 1 and 2, a bottom portion 128 of the undercarriage 114 may be provided with a plurality of rollers or rollers assemblies 126. Accordingly, any number of rollers or roller assemblies may be incorporated into the bottom portion 128 of the undercarriage 114.

Figure 3:
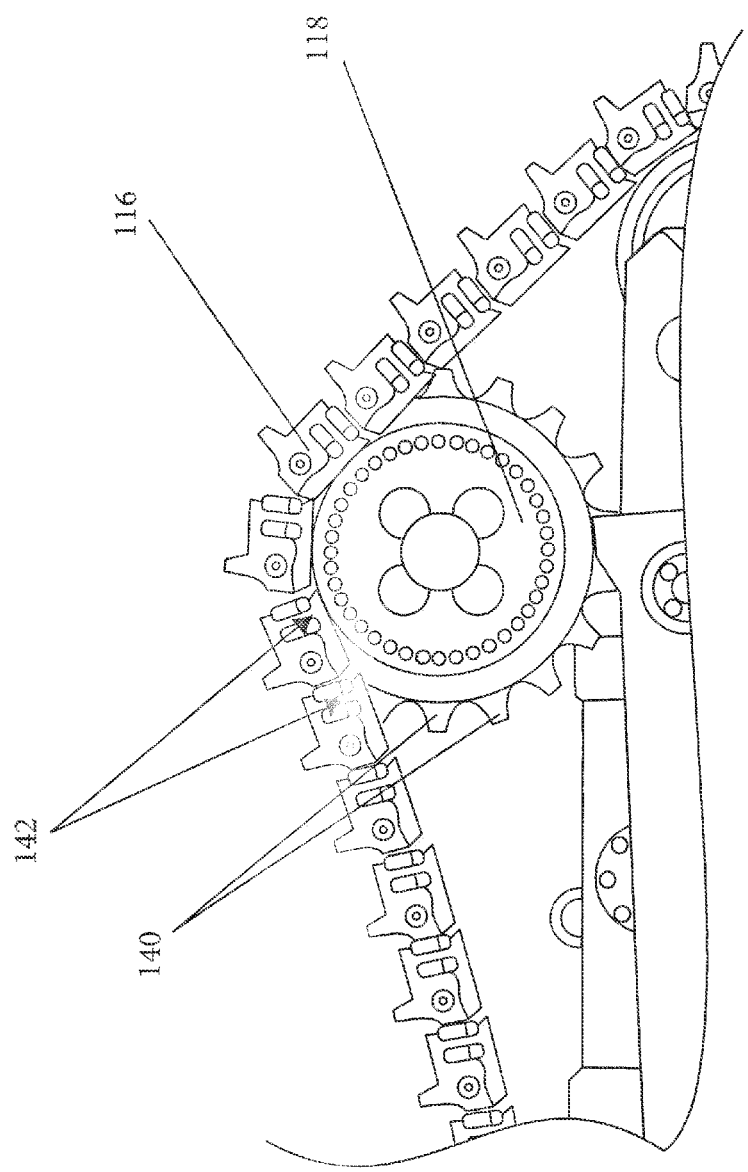
FIG. 3 is a fragmentary side view of a lower portion of the machine from FIG. 1 showing a drive sprocket engaged with a drive track.
Figure 4:
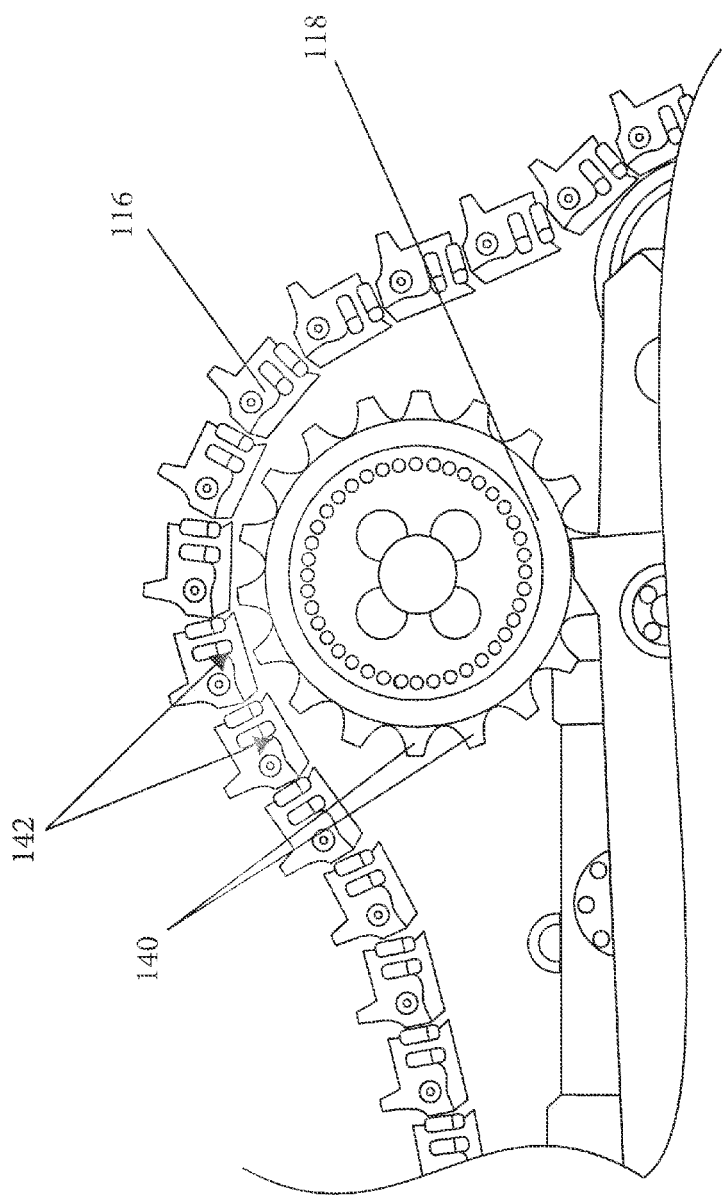
FIG. 4 is a fragmentary side view of a lower portion of the machine from FIG. 1 showing a drive sprocket disengaged with a drive track.
Figure 4:
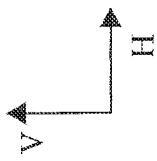
Figure 5:
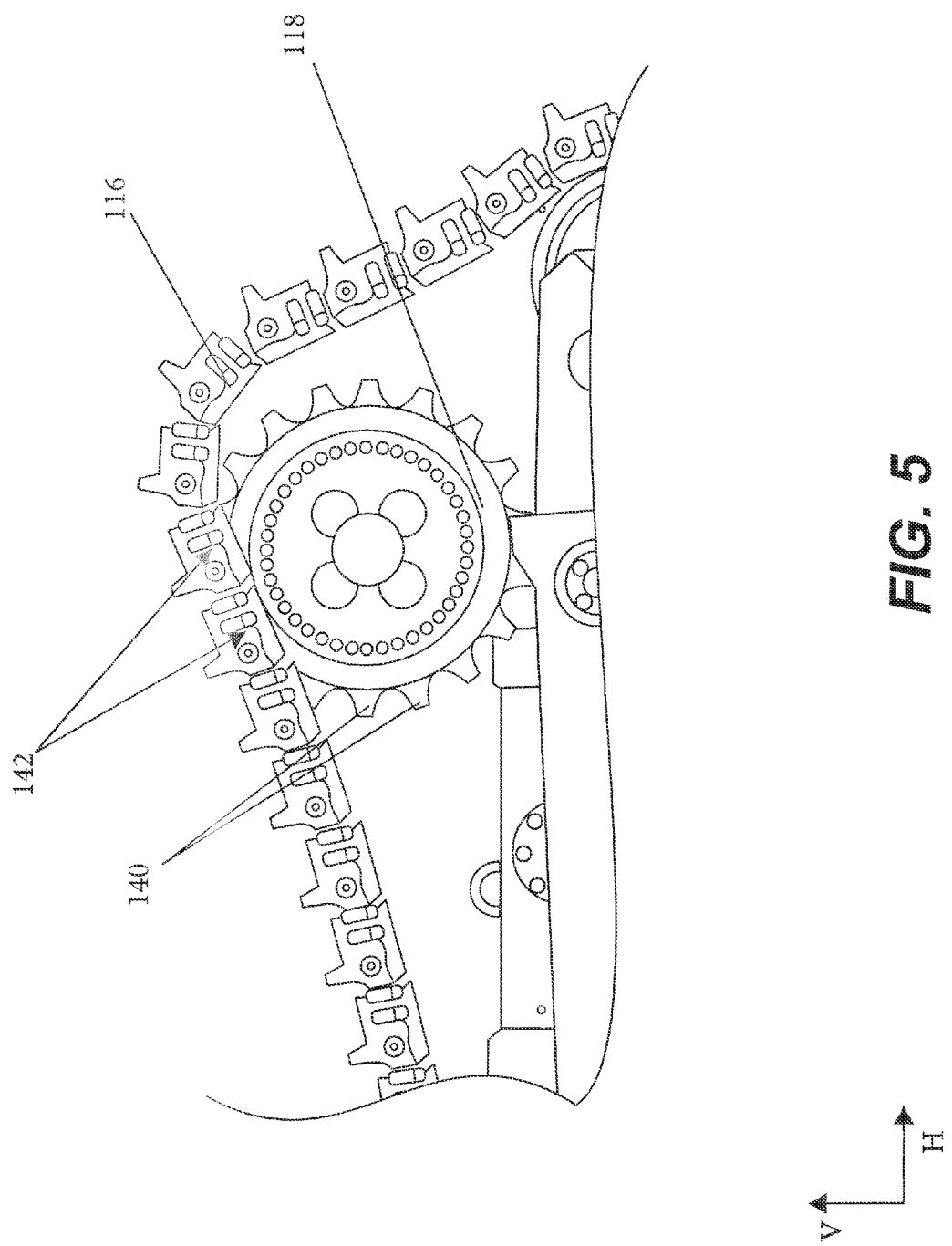
FIG. 5 is a fragmentary side view of a lower portion of the machine from FIG. 1 showing a drive sprocket just becoming re-engaged with a drive track.

Now referring to FIGS. 3-5, the drive track 116 and sprocket 118 are illustrated in various stages during operation of the machine 100. With reference to FIG. 3, the drive track 116 is engaged with the drive sprocket 118. The drive sprocket 118 may include a plurality of teeth 140 that are arranged around 360-degrees of a periphery of the drive sprocket 118. In this manner, as the drive sprocket 118 rotates, the plurality of teeth 140 of the drive sprocket engage the drive track 116. In order for the drive sprocket 118 to engage the drive track 116, the drive track 116 may include a plurality of teeth engaging portions 142. In some aspects the plurality of teeth engaging portions 142 are voids in the drive track 116 that are configured to engage the teeth 140 of the drive sprocket 118. As such, when the drive track 116 moves, the plurality of teeth engaging portions 142 may engage a portion of the plurality of teeth 140 of the drive sprocket 118. The engagement of the portion of the plurality of teeth 140 of the drive sprocket with the plurality of teeth engaging portions 142 of the drive sprocket 118 may allow torque/power to be transmitted from the motor 104 to the drive sprocket 118 and, ultimately, to the drive track 116 to move the machine 100 and any corresponding load.

In some aspects, the portion of the plurality of teeth 140 of the drive sprocket 118 is greater than about 180 degrees of the periphery of the drive sprocket 118. Alternatively, in some other aspects, the portion of the plurality of teeth 140 of the drive sprocket 118 is less than about 180 degrees of the periphery of the drive sprocket 118. For example, the portion of the plurality of teeth 140 of the drive sprocket 118 may be 179 degrees, 178 degrees, 177 degrees, 176 degrees, 175 degrees, or any number less than 175 degrees, such as 170 degrees. Specifically, in some aspects, the portion of the plurality of teeth 140 of the drive sprocket 118 may be less than or equal to about 90 degrees of the periphery of the drive sprocket 118. For example, the portion of the plurality of teeth 140 of the drive sprocket 118 may be 89 degrees, 88 degrees, 87 degrees, 86 degrees, 85 degrees, or any number less than 85 degrees, such as 80 degrees. In general, it should be appreciated that the portion of the plurality of teeth 140 of the drive sprocket 118 may be equal to any degree less than or equal to about 360 degrees.

As shown in FIG. 3, when the portion of teeth 140 of the drive sprocket 118 is engaged with the corresponding portion of the plurality of teeth engaging portions 142 of the drive track 116, this may be referred to as a "steady state" operation. More specifically, the steady state may occur when the portion of the plurality of teeth 140 of the drive sprocket 118 have been engaged with the corresponding portion of the plurality of teeth engaging portions 142 of the drive track 116 for at least an extended duration of time, such as at least five seconds. However, it should be appreciated that the duration of time can be any length of time after which the drive sprocket 118 has experienced a minimum and a maximum torque load. In some aspects, the duration of time may be far longer than five seconds.

During steady state operation, the drive system may operate within an operating torque load range, which may have a minimum torque load and a maximum torque load. For example, the drive system may experience the maximum torque load when the machine 100 is moving a heavy load up a hill and/or perhaps when the machine 100 just begins moving from a complete stop. In another aspect, the drive system may experience a minimum torque load of zero when the machine 100 is at idle or during shutdown. It should be appreciated that these are two of the many aspects when the drive system may experience the minimum and maximum torque loads. In general, the steady state operation of the machine 100 may produce the torque loads within the operating torque load range, none of which torque loads may be harmful to the motor 104.

As illustrated in FIG. 4, in some situations, the drive track 116 may become disengaged from the drive sprocket 118. This event may be known as "sprocket jumping," which may also be described as the drive track 116 jumping or slipping from the teeth 140 of the drive sprocket 118. As shown in FIGS. 4 and 5, when the drive sprocket 118 disengages from the drive track 116, the drive sprocket 118 may momentarily speed freely and then slam against a subsequent engaging portion of the drive track 116. The sudden acceleration of the drive sprocket 118 may induce a high acceleration at the end of the drive sprocket 118. As such, sprocket jumping results in the drive track 116 failing to properly receive torque from the drive sprocket 118.

Sprocket jumping may occur for a number of reasons, including, but not limited to the machine 100 steering, travelling over uneven or rough terrain, travelling at high speeds, moving large loads, fatigue and/or wear on the drive track 116 and/or drive sprocket 118 that causes the drive sprocket 118 to fail to properly engage the drive track 116, and/or any other reason that might cause a drive track 116 to disengage from a drive sprocket 118.

Referring to FIG. 5, when the drive sprocket 118 reengages with the drive track 116, this may result in extremely high forces acting on the drive sprocket 118 causing the drive sprocket 118 and motor 104 to suddenly decelerate. The sudden acceleration and deceleration may result in extremely high torque loads on the motor 104, which may effectively result in the pistons damaging the barrel of the motor 104. It should also be appreciated that sprocket jumping may result in other negative consequences, such as a loud banging noise.

Figure 6:
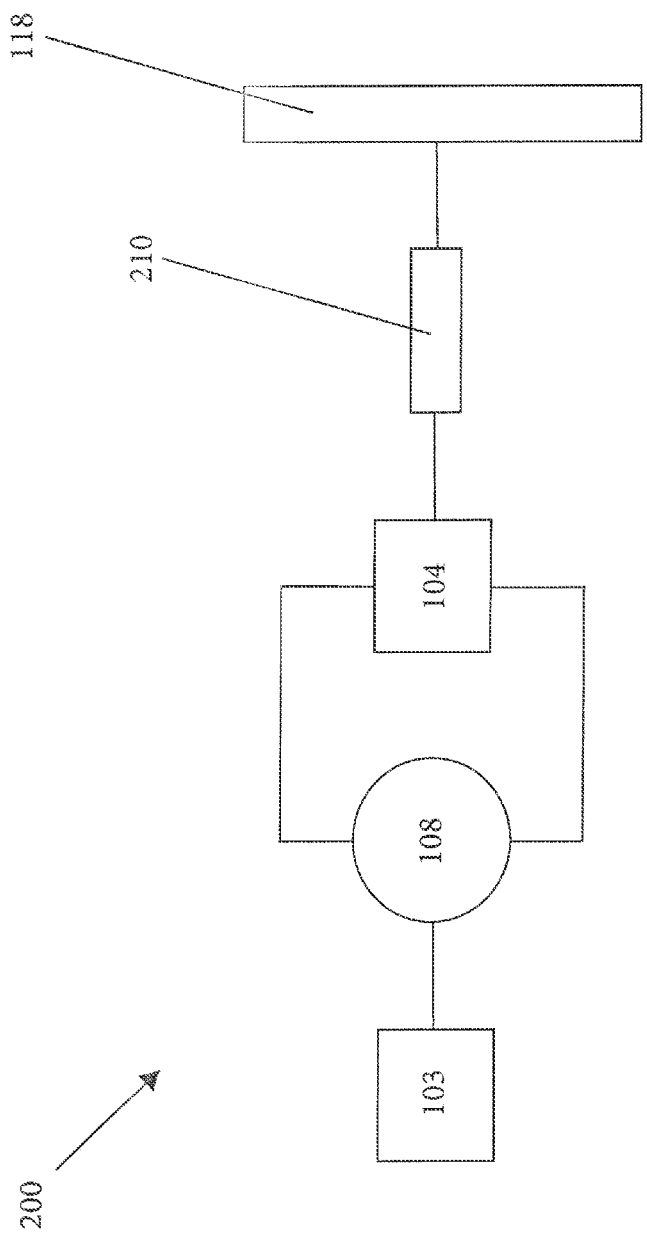
FIG. 6 is a schematic representation of a hydraulic drive system according to an aspect of the disclosure.

As illustrated by the schematic in FIG. 6, a drive system 200 may further include a torsional isolation member 210 operably connected between the motor 104 and the drive sprocket 118, which may reduce the amount of torque experienced by the motor 104 from sprocket jumping. The torsional isolation member 210 may be arranged and configured to operably disconnect the motor 104 from the drive sprocket 118 when the drive sprocket 118 reaches a predetermined torque load, such as the extreme torque load experienced during sprocket jumping. As such, when the portion of the plurality of teeth 140 of the drive sprocket 118 disengage from the drive track 116 and then reengage the drive track 116, the torsional isolation member 210 may disengage the drive sprocket 118 from the motor 104.

By operably disconnecting the motor 104 from the drive sprocket 118, the torsional isolation member 210 may act as a safety device to thereby safeguard the motor 104 from the extreme acceleration and torque loads that may otherwise damage the motor 104. Upon operably disconnecting, or decoupling, the motor 104 from the drive sprocket 118, this may allow the drive sprocket 118 to spin freely and not transmit the rotational forces to the motor 104. Once the drive sprocket 118 has reengaged with the drive track 116 and the torque load has decreased to a torque load that is within the torque load operating range, the torsional isolation member 210 may reconnect the motor 104 to the drive sprocket 118 to thereby allow the motor 104 to properly apply torque/power to the drive sprocket 118.

Figure 7:
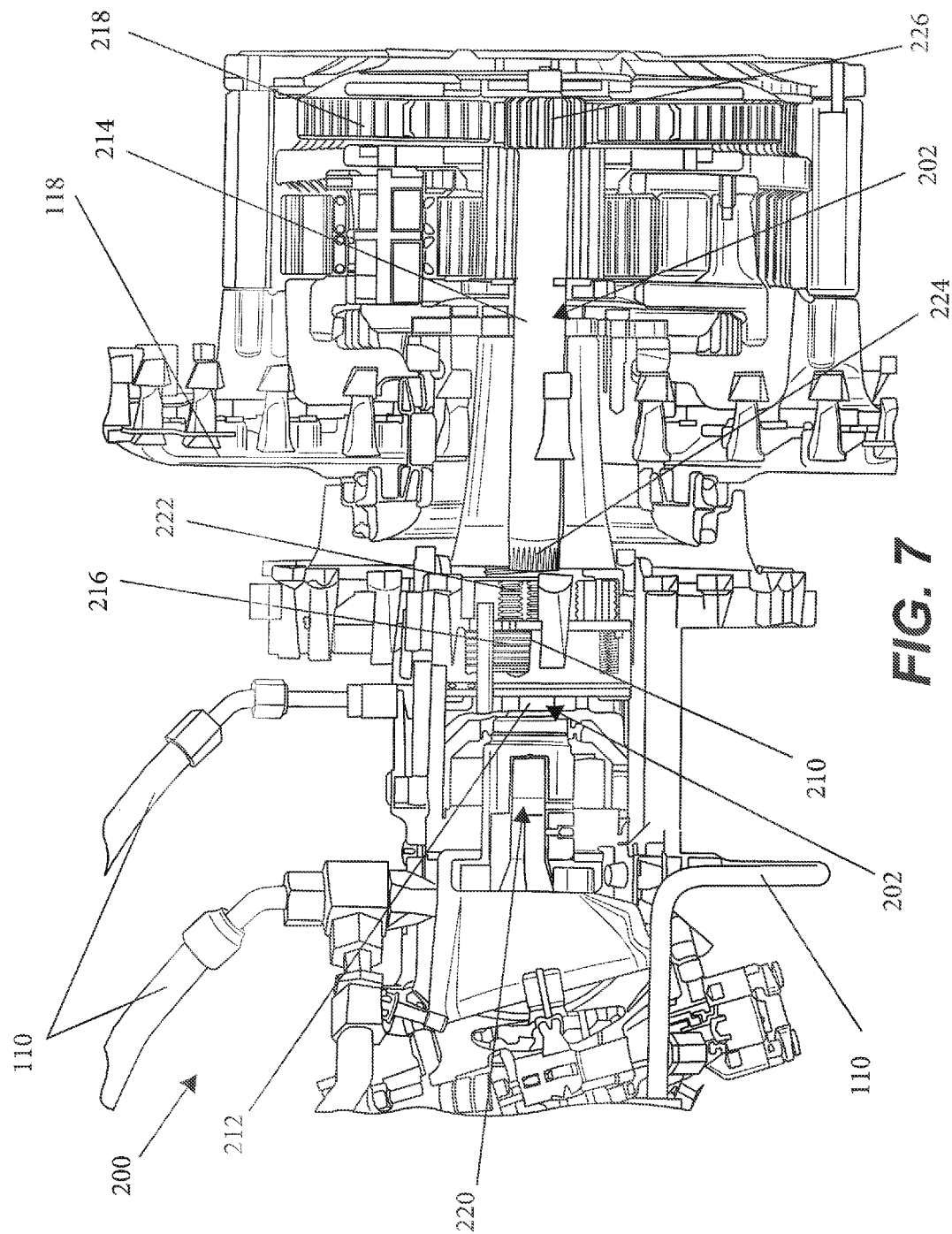
FIG. 7 is a fragmentary perspective view of a hydraulic drive system according to another aspect of the disclosure.

As shown in FIG. 7, drive system 200 may include a drivetrain 202 having at least one shaft operably connected to the motor 104. It should be appreciated that the motor 104 may be configured to rotate the drivetrain 202. The drive system 200 may also include the drive sprocket 118 operably connected to the drivetrain 202. The rotation of the drivetrain 202 may rotate the drive sprocket 118 such that the drive sprocket 118 thereby moves the drive track 116.

With continued reference to FIG. 7, some aspects of the drive system 200, via the drivetrain 202, may include a motor shaft 212 having a first end 220 and a second end 222 opposite the first end 220. In this regard, the first end 220 of the motor shaft 212 may be operably connected to the motor 104. Likewise, the drive system 200 may also include a drive shaft 214 having a first end 224 and a second end 226 opposite the first end 224. The first end 224 of the drive shaft 214 may be operably connected to the second end 222 of the motor shaft 212. In some aspects, the drive system 200 includes a final drive 218, such as a pair of planetary reduction gears 218, operably connected between the second end 226 of the drive shaft 214 and the drive sprocket 118. The planetary reduction gears 218 may withstand higher engine torque because they distribute the forces over multiple gear teeth. As well, the drive system 200 may further include a brake pack 216 operably connected to the drivetrain 202. The brake pack 216 may slow the rotation of the drivetrain 202 by applying torsional forces to the motor shaft 212 and/or drive shaft 214, which are opposite the rotation of the drivetrain, to thereby slow the travel speed of the machine 100.

In some aspects, when the torsional isolation member 210 disconnects the motor 104 from the drive sprocket 118, upon the drive sprocket 118 reaching the predetermined torque load, the torsional isolation member 210 disconnects the second end of the motor shaft 212 from the first end of the drive shaft 214. However, it should be appreciated that this is just one of many examples. The drivetrain may be comprised of any number of shafts that may be operably connected and disconnected by the torsional isolation member 210. As such, the torsional isolation member 210 may be arranged and configured in any suitable manner to achieve this objective. For example, the torsional isolation motor may be arranged and configured on the brake pack 216 to thereby operably connect and disconnect the motor shaft 212 from the drive shaft 214.

In this regard, the torsional isolation member 210 may be any device configured to connect and disconnect two rotating shafts, such as a clutch or torsion damper, when one of the rotating shafts experiences a high torque. For example, as illustrated in FIG. 7, the torsional isolation member 210 may be a slip-clutch that slips when the drive sprocket 118 reaches the predetermined torque load to thereby operably disconnect the drive sprocket 118 from the motor 104. Accordingly, when the torque load on the drive sprocket 118 decreases to within the torque load operating range, the slip-clutch may then operably re-connect the drive sprocket 118 to the motor 104. Moreover, in some examples, the torsional isolation member 210 may be a belt clutch, dog clutch, hydraulic clutch, electromagnetic clutch, overrunning clutch, freewheel, or wrap-spring clutch. As well, the torsional isolation member 210 may include any combination of clutches and/or torsion dampers working in series or parallel, such as a slip-clutch and a torsion damper operably connected between the motor 104 and the drive sprocket 118.

In some aspects the torsional isolation member 210 is a slip-clutch that is biased to a locked position, whereby the slip-clutch is biased towards engaging the motor 104 to the drive sprocket 118, via the drive shaft 214. In this manner, when the drive sprocket 118 experiences the predetermined torque load, the slip-clutch may switch to an open position to thereby disconnect the motor 104 from the drive sprocket 118.

The predetermined torque load may be dependent upon the maximum torque load and/or the minimum torque load. For example, the predetermined torque load may be equal to approximately four times the maximum torque load of the operating torque range. Yet in some aspects, the predetermined torque load may be equal to any torque load that is greater than or less than four times the maximum torque load, for example, five times the maximum torque load, or even three times the maximum torque load.

The disclosure also includes a method of manufacturing a drive system 200. The method may include connecting a drivetrain having at least one shaft to a motor 104. Accordingly, the motor 104 may be arranged and configured to rotate the drivetrain having at least one shaft. The method may also include connecting a drive sprocket 118 to the drivetrain such that the rotation of the drivetrain rotates the drive sprocket 118. The drive sprocket 118 may be arranged and configured to move a drive track 116. The method may also include connecting a torsional isolation 210 between the motor 104 and the drive sprocket 118. It should be appreciated that the torsional isolation member 210 may be arranged and configured to operably disconnect the motor 104 from the drive sprocket 118 when the drive sprocket 118 reaches a predetermined torque load.

As well, in some aspects of the method, the motor 104 may be a hydraulic motor and the torsional isolation member 210 may be a slip-clutch that is biased to a locked position. Furthermore, when the plurality of teeth 140 of the drive sprocket 118 have been engaged with the corresponding plurality of teeth engaging portions 142 of the drive track 116 for an extended duration of time, for example, at least five seconds, the drive system may operate within an operating torque range. Accordingly, the torsional isolation member 210 may operably disconnect the motor 104 from the drive sprocket 118 when the predetermined torque load is equal to four times a maximum of the operating torque range.

INDUSTRIAL APPLICABILITY

The present disclosure is applicable to drive systems on machines, and more specifically to hydraulic drive systems on track machines. In general, it can therefore be seen that the teachings of the present disclosure can find industrial applicability in any number of different situations wherein a drive sprocket reaches an extreme torque load that could potentially damage a motor. For example, track machines are configured to push material and loads along the ground, and during operation, the machines may experience sprocket jumping whereby a drive sprocket spins free of the drive track. Upon the drive sprocket catching, or reengaging, with a subsequent portion of the drive track, this may result in very high torque loads, some of which may be damaging to the motor.

However, by using the drive system and the torsional isolation member of the present disclosure, when the machine experiences a dangerously high torque load, such as from sprocket jumping, the drive sprocket may be able to spin freely and upon doing so, the drive sprocket may become disengaged from the motor, thereby isolating the motor from dangerous acceleration or high torque loads. Accordingly, when the drive sprocket reengages with the drive track and the torque load has reduced to a torque load that is within a torque load operating range (i.e. torque loads that are safe for the motor 104), the torsional isolation member may operably re-connect the drive sprocket to the motor to resume operation that is safe for the motor. As such, the foregoing drive system may reduce downtime of machines, because it may reduce the occurrence of breakdowns. Accordingly, the foregoing system may reduce maintenance and replacement costs as well as prolonging the usable life of the motor.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein may be performed in any suitable order unless otherwise indicated herein or otherwise clearly contradicted by context.

We claim:

1. A drive system, comprising:
a motor;
a drivetrain having at least one shaft operably connected to the motor, wherein the motor is configured to rotate the drivetrain;
a drive sprocket operably connected to the drivetrain such that rotation of the drivetrain rotates the drive sprocket, wherein the drive sprocket is arranged and configured to move a drive track; and
a torsional isolation member operably connected between the motor and the drive sprocket, wherein the torsional isolation member is arranged and configured to operably disconnect the motor from the drive sprocket when the drive sprocket reaches a predetermined torque load,
wherein the drive sprocket defines a plurality of teeth that are arranged around 360-degrees of a periphery of the drive sprocket and arranged and configured to engage the drive track, the drive track is movably connected to the drive sprocket and includes a plurality of teeth engaging portions that are arranged and configured to engage a portion of the plurality of teeth of the drive sprocket, and the portion of the plurality of teeth of the drive sprocket is less than 180 degrees of the periphery of the drive sprocket.

2. The drive system of claim 1, wherein the torsional isolation member is a slip-clutch.

3. The drive system of claim 2, wherein the slip-clutch is biased to a locked position.

4. The drive system of claim 1, wherein the portion of the plurality of teeth of the drive sprocket is less than or equal to 90 degrees of the periphery of the drive sprocket.

5. The drive system of claim 4, wherein when the portion of the plurality of teeth of the drive sprocket disengage from the drive track and then reengage the drive track, the torsional isolation member disengages the drive sprocket from the motor.

6. The drive system of claim 5, wherein when the portion of the plurality of teeth of the drive sprocket have been engaged with the corresponding plurality of teeth engaging portions of the drive track for at least five seconds, the drive system operates within an operating torque range, and wherein the predetermined torque load is equal to four times a maximum of the operating torque range.

7. The drive system of claim 6, further comprising a hydraulic pump operably connected to an engine that is configured to actuate the hydraulic pump, wherein the motor is a hydraulic motor that is actuated by the hydraulic pump, and wherein the drivetrain includes:
a motor shaft having a first end and a second end opposite the first end, wherein the first end of the motor shaft is operably connected to the hydraulic motor;
a drive shaft having a first end and a second end opposite the first end, wherein the first end of the drive shaft is operably connected to the second end of the motor shaft; and
a pair of planetary gears operably connected between the second end of the drive shaft and the drive sprocket, and wherein when the slip-clutch disconnects the hydraulic motor from the drive sprocket upon the drive sprocket reaching a predetermined torque load, the slip-clutch disconnects the second end of the motor shaft from the first end of the drive shaft, the drive system further comprising a brake pack operably connected to the drivetrain, wherein the brake pack is configured to impede the rotation of the drivetrain.

8. A machine, comprising:
a motor;
a drivetrain having at least one shaft operably connected to the motor, wherein the motor is arranged and configured to rotate the drivetrain;
a drive sprocket operably connected to the drivetrain such that rotation of the drivetrain rotates the drive sprocket;

a drive track movably connected to the drive sprocket; and
a torsional isolation member operably connected between the motor and the drive sprocket, the torsional isolation member arranged and configured to operably disconnect the motor from the drive sprocket when the drive sprocket reaches a predetermined torque load, wherein the torsional isolation member is a slip-clutch that is biased to a locked position.

9. The machine of claim 8, further comprising first and second idlers rotatably connected to the drive track and spaced from each other along a horizontal direction, wherein the drive sprocket is mounted above the first and second idlers along a vertical direction that is perpendicular to the horizontal direction.

10. The machine of claim 9, wherein the drive sprocket defines a plurality of teeth that are arranged around 360-degrees of a periphery of the drive sprocket and arranged and configured to engage the drive track, and wherein the drive track defines a plurality of teeth engaging portions that are arranged and configured to engage a portion of the plurality of teeth of the drive sprocket.

11. The machine of claim 10, wherein the portion of the plurality of teeth of the drive sprocket is less than or equal to 90 degrees of the periphery of the drive sprocket, wherein when the plurality of teeth of the drive sprocket have been engaged with the corresponding plurality of teeth engaging portions of the drive track for at least five seconds, the drive system operates within an operating torque range, and wherein the predetermined torque load is equal to four times a maximum of the operating torque range.

12. The machine of claim 11, wherein the motor is a hydraulic motor, and wherein the drivetrain includes:
a motor shaft having a first end and a second end opposite the first end, wherein the first end of the motor shaft is operably connected to the hydraulic motor;
a drive shaft having a first end and a second end opposite the first end, wherein the first end of the drive shaft is operably connected to the second end of the motor shaft; and
a pair of planetary gears operably connected between the second end of the drive shaft and the drive sprocket, and wherein when the slip-clutch disconnects the hydraulic motor from the drive sprocket upon the drive sprocket reaching a predetermined torque load, the slip-clutch disconnects the second end of the motor shaft from the first end of the drive shaft, the drive system further comprising a brake pack operably connected to the drivetrain, wherein the brake pack is configured to impede the rotation of the drivetrain.

13. A method of manufacturing a drive system, comprising:
connecting a drivetrain having at least one shaft to a motor, wherein the motor is arranged and configured to rotate the drivetrain;
connecting a drive sprocket to the drivetrain such that the rotation of the drivetrain rotates the drive sprocket, wherein the drive sprocket defines a plurality of teeth that are arranged around 360-degrees of a periphery of the drive sprocket;
connecting a drive track to the drive sprocket, wherein the drive sprocket is arranged and configured to move the drive track, wherein the drive track has a plurality of teeth engaging portions that are arranged and configured to engage a portion of the plurality of teeth of the drive sprocket, the portion of the plurality of teeth of the drive sprocket is less than 180 degrees of the periphery of the drive sprocket; and
connecting a torsional isolation member between the motor and the drive sprocket, wherein the torsional isolation member is arranged and configured to operably disconnect the motor from the drive sprocket when the drive sprocket reaches a predetermined torque load.

14. The method of claim 13, wherein the drive track moves around a first idler, a second idler, wherein the first and second idlers are spaced from each other along a horizontal direction, and the drive sprocket that is arranged between the first and second idlers along the horizontal direction and above the first and second idlers along a vertical direction that is perpendicular to the horizontal direction.

15. The method of claim 14, further comprising arranging and configuring the drive sprocket such that the portion of the plurality of teeth of the drive sprocket is less than or equal to 90 degrees of the periphery of the drive sprocket.

16. The method of claim 15, wherein the motor is a hydraulic motor and the torsional isolation member is a slip-clutch that is biased to a locked position, wherein when the plurality of teeth of the drive sprocket have been engaged with the corresponding plurality of teeth engaging portions of the drive track for at least five seconds, the drive system operates within an operating torque range, and wherein the predetermined torque load is equal to four times a maximum of the operating torque range.

* * * * *